US012764214B2

(12) United States Patent
Zhou

(10) Patent No.: US 12,764,214 B2
(45) Date of Patent: Oct. 13, 2026

(54) DISPLAY MODULES

(71) Applicant: Wuhan China Star Optoelectronics Semiconductor Display Technology Co., Ltd., Wuhan (CN)

(72) Inventor: Wenjun Zhou, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 172 days.

(21) Appl. No.: 18/522,336

(22) Filed: Nov. 29, 2023

(65) Prior Publication Data

US 2024/0333827 A1 Oct. 3, 2024

(30) Foreign Application Priority Data

Mar. 30, 2023 (CN) ......................... 202310336400.9

(51) Int. Cl.
*H04M 1/02* (2006.01)

(52) U.S. Cl.
CPC ....... *H04M 1/0268* (2013.01); *H04M 1/0277* (2013.01)

(58) Field of Classification Search
CPC H04M 1/0268; H04M 1/0277; H01K 77/111; G06F 1/1616; H05K 1/0281
USPC ..................................................... 361/679.01
See application file for complete search history.

(56) References Cited

U.S. PATENT DOCUMENTS 9,818,974 B2 * 11/2017 Kwon .................... H10K 59/40
10,509,277 B2 12/2019 Bai et al.
10,658,436 B2 * 5/2020 Shin .................... H10K 59/8731
10,943,961 B2 * 3/2021 Kim ...................... H10K 59/131
11,114,426 B2 * 9/2021 Wang .................... H05K 1/0281
11,889,647 B2 * 1/2024 Ahmed .................. G06F 1/1637
12,114,440 B2 10/2024 Qin et al.
12,382,594 B2 * 8/2025 Kwon .................. H10K 77/111
2014/0217382 A1 * 8/2014 Kwon ................ H10K 50/8426 257/40
2018/0011576 A1 * 1/2018 Ryu ......................... G09F 9/301
2018/0081399 A1 * 3/2018 Kwon ....................... G09G 5/00
(Continued)

FOREIGN PATENT DOCUMENTS

CN 109872635 6/2019
CN 110022388 7/2019
(Continued)

OTHER PUBLICATIONS

Notification of Office Action and Search Report Dated Jan. 10, 2026 From the State Intellectual Property Office of the People's Republic of China Re. Application No. 202310336400.9 and Its Translation Into English. (19 Pages).

*Primary Examiner* — Dimary S Lopez Cruz

(57) ABSTRACT

Disclosed is a display module including a flexible display panel, a bearing assembly, and a first colloid. The flexible display panel includes a display portion, a bending portion, and a binding portion, the display portion and the binding portion are connected to each other by the bending portion, and the binding portion is located at a rear portion of the display portion. The bearing assembly is disposed between the display portion and the binding portion, and there is a bending space between the bearing assembly and the bending portion. The first colloid disposed in the bending space and connected to the bearing assembly and the bending portion.

14 Claims, 4 Drawing Sheets

(56) References Cited

U.S. PATENT DOCUMENTS

| | | | |
|---|---|---|---|
| 2024/0172404 | A1 | 5/2024 | Sun |
| 2025/0098482 | A1 | 3/2025 | Hu |

FOREIGN PATENT DOCUMENTS

| | | |
|---|---|---|
| CN | 111785169 | 10/2020 |
| CN | 112071203 | 12/2020 |
| CN | 113539104 | 10/2021 |
| CN | 114613269 | 6/2022 |
| CN | 115775499 | 3/2023 |
| WO | WO 2019/127705 | 7/2019 |

* cited by examiner

DISPLAY MODULES

CROSS-REFERENCE TO RELATED APPLICATION

This application claims the benefit of priority of China Patent Application No. 202310336400.9, filed on Mar. 30, 2023, the contents of which are incorporated by reference as if fully set forth herein in their entirety.

TECHNICAL FIELD

The present disclosure relates to a field of display technologies, and more particularly, to display modules.

BACKGROUND

With the development of display technology, display modules of mobile phones and wearable devices have gradually tended to be thin and narrow bezel designs. A support structure such as SCF (Super Clean Foam) and Stiffener (double-sided adhesive tape) is attached to a rear surface of a display panel of the display module. The implementation of the narrow bezel solution of the display module is mainly realized by bending a binding area of the display panel so that the binding area is bent onto the support structure on the rear surface of the display panel, thereby generally reducing a bending radius of the binding area by reducing the thickness of the support structure of the display panel, and reducing the bezel width of the display module. However, blindly reducing the thickness of the support structure may lead to the poor stability of the display module after bending due to the decrease of the strength of the display module.

Therefore, there is an urgent need for a display module to solve the above technical problems.

SUMMARY

An embodiment of the present disclosure provides display modules, which may solve at least one of the above technical problems.

An embodiment of the present disclosure provides a display module including:

A flexible display panel including a display portion, a bending portion, and a binding portion, the display portion and the binding portion are connected by the bending portion, and the binding portion is located at a rear portion of the display portion;

A bearing assembly disposed between the display portion and the binding portion, there is a bending space between the bearing assembly and the bending portion; and A first colloid disposed in the bending space and connected to a surface of the first back plate facing the bending space, a surface of the second back plate facing the bending space, and the bending portion.

Optionally, in some embodiments of the present disclosure, the bending space includes a first subspace, and the bearing assembly includes:

A first back plate provided at a side of the display portion facing the binding portion;

A second back plate provided at a side of the binding portion facing the display portion; and A buffer layer provided at a surface of the first back plate away from the display portion;

The first subspace is between a surface of the first back plate facing the bending portion, a surface of the second back plate facing the bending portion, and the bending portion, the first colloid is disposed in the first subspace, and the first colloid is connected to at least one of the first back plate, the second back plate, or the buffer layer.

Optionally, in some embodiments of the present disclosure, the display module further includes a second colloid, and the second colloid is connected to a surface of the second back plate facing the first back plate, and the second colloid is connected to the first colloid.

Optionally, in some embodiments of the present disclosure, the bending space further includes a second subspace in communication with the first subspace;

The second subspace is between a surface of the first back plate facing the second back plate, a surface of the buffer layer facing the bending portion, and the surface of the second back plate facing the first back plate, the second colloid is provided in the second subspace, and the second colloid is connected to the surface of the first back plate facing the second back plate and the surface of the buffer layer facing the bending portion.

Optionally, in some embodiments of the present disclosure, the bending space includes a third subspace in communication with the first subspace;

An edge of a surface of the buffer layer away from the first back plate is provided with a groove as a third subspace, and the second colloid is provided in the groove and connected to a groove wall of the groove.

Optionally, in some embodiments of the present disclosure, the second back plate is at least partially received within the groove.

Optionally, in some embodiments of the present disclosure, an orthographic projection of the second colloid on the buffer layer covers an orthographic projection of the second back plate on the buffer layer.

Optionally, in some embodiments of the present disclosure, the second colloid and the first colloid are of a same material.

Optionally, in some embodiments of the present disclosure, a viscosity of the first colloid in the first state is W, and 20,000 Cp≤W≤60,000 Cp.

Optionally, in some embodiments of the present disclosure, the display module further includes a protective adhesive layer disposed on a surface of the bending portion away from the bending space and extending to connect to the display portion and the binding portion.

EMBODIMENTS OF INVENTION

Figure 1:
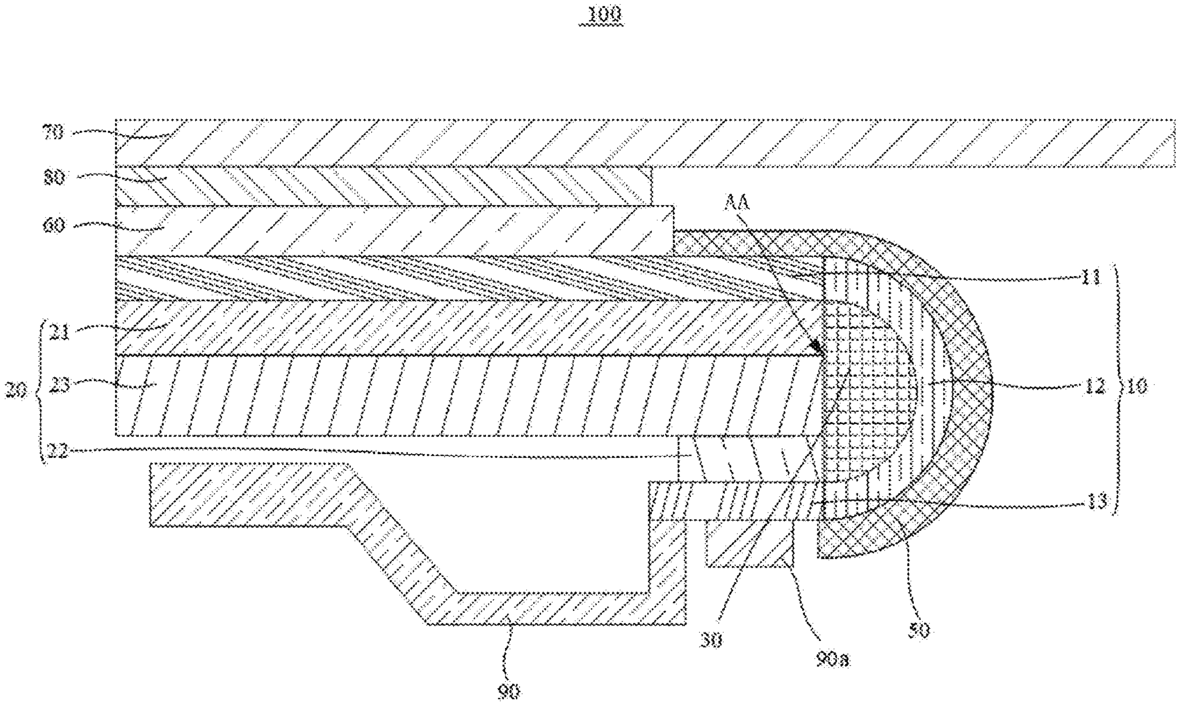
FIG. 1 is a schematic structural diagram of a display module according to a first embodiment of the present disclosure.

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure. In addition, it should be understood that the specific implementations described here are only used to illustrate and explain the present disclosure, and are not used to limit the present disclosure. In the present disclosure, unless otherwise stated, directional words used such as "upper" and "lower" generally refer to the upper and lower directions of the device in actual use or working state, and specifically refer to the drawing directions in the drawings; and "inner" and "outer" refer to the outline of the device.

The embodiment of the present disclosure provides a display module. Detailed descriptions are given below. It should be noted that the order in which the following embodiments are described is not intended to limit the preferred order of the embodiments.

Referring to FIG. 1, a first embodiment of the present disclosure provides a display module 100 including a flexible display panel 10, a bearing assembly 20, and a first colloid 30.

The flexible display panel 10 includes a display portion 11, a bending portion 12, and a binding portion 13, the display portion 11 and the binding portion 13 are connected by the bending portion 12, and the binding portion 13 is located at the back of the display portion 11. The bearing assembly 20 is provided between the display portion 11 and the binding portion 13, and a bending space AA is formed between the bearing assembly 20 and the bending portion 12. The first colloid 30 is provided in the bending space AA, and the first colloid 30 is connected to the bearing assembly 20 and the bending portion 12.

In the display module 100 of the present embodiment, the first colloid 30 is provided in the bending space AA between the bending portion 12 and the bearing assembly 20, and the first colloid 30 is connected to the bearing assembly 20 and the bending portion 12. In this way, not only can the bearing assembly 20 and the bending portion 12 be connected with each other and not easily disengaged from each other, but the first colloid 30 also functions as a good support, so that the strength requirement for the bending portion 12 may be ensured even if the bending radius of the bending portion 12 is optimally reduced to reduce the bezel size of the display module 100. Further, the display effect of the display module 100 is improved while the structural stability of the display module 100 is ensured.

In the display module 100 of the present disclosure, the flexible display panel 10 is a flexible and foldable panel, such as an OLED display panel, an Mini-LED display panel, an Micro-LED display panel, or the like. A rear portion of the display portion 11 of the flexible display panel 10 is a side away from a light-emitting side, the display portion 11 includes a switching control layer and a light-emitting functional layer disposed in a stacked manner, and the light-emitting functional layer is electrically connected to the switching control layer, so that the display mode and the display effect of the display portion 11 may be adjusted and controlled by the structural design of the switching control layer and the light-emitting functional layer. A side of the binding portion 13 of the flexible display panel 10 away from the display portion 11 is connected to a circuit board 90 and a chip 90*a*, and the bending portion 12 is used to electrically connect the switching control layer in the display portion 11 to the circuit board 90 and the chip 90*a* on the binding portion 13. That is, the bending portion 12 is provided with a conductive wiring structure to guide a wiring structure of the display portion 11 to the binding portion 13, so that it is convenient to adjust and control the display mode of the flexible display panel 10 while reducing the size of the bezel area of the display module 100.

In addition, the display module 100 further includes a polarizing plate 60, a cover plate 70, and an optical adhesive layer 80. The polarizing plate 60 is provided at a side of the display portion 11 of the flexible display panel 10 away from a first back plate 21, that is, the polarizing plate 60 is attached to the light-emitting side of the flexible display panel 10. By attaching the polarizing plate 60 to the display portion 11 of the flexible display panel 10, on the one hand, it is advantageous to improve a contrast of an image of the flexible display panel 10, and on the other hand, it is advantageous to improve the display viewing angle of the flexible display panel 10 and the overall display effect of the flexible display panel 10. The cover plate 70 is adhered to the polarizing plate 60 by the optical adhesive layer 80 provided on the polarizing plate 60, and the optical adhesive layer 80 also has a large light transmittance, thereby ensuring that the cover plate 70 and the polarizing plate 60 are stably adhered to each other while avoiding influence on the light output amount of the flexible display panel 10, and ensuring normal display of the flexible display panel 10. The cover plate 70 is provided at the light-emitting side of the flexible display panel 10 and covers the entire flexible display panel 10 so as to protect the flexible display panel 10 from erosion by external moisture or oxygen, thereby ensuring normal display of the flexible display panel 10. Since the cover plate 70 is located at the light-emitting side of the flexible display panel 10, when the cover plate 70 is manufactured, a material having a relatively high light transmittance, such as a glass material, is selected so that the cover plate 70 ensures that the flexible display panel 10 has sufficient light output while protecting the flexible display panel 10, thereby ensuring the overall display effect of the flexible display panel 10.

Alternatively, the bending space AA includes a first sub-space Aa, and the bearing assembly 20 includes a first back plate 21, a second back plate 22 and a buffer layer 23. The first back plate 21 is provided at a side of the display portion 11 facing the binding portion 13. The second back plate 22 is provided at a side of the binding portion 13 facing the display portion 11. The buffer layer 23 is provided at a surface of the first back plate 21 away from the display portion 11. The first sub-space Aa is formed between a surface of the first back plate 21 facing the bending portion 12, a surface of the second back plate 22 facing the bending portion 12, and the bending portion 12, the first colloid 30 is provided in the first sub-space Aa, and the first colloid 30 is connected to at least one of the first back plate 21, the second back plate 22, and the buffer layer 23.

Among them, the first back plate 21 and the second back plate 22 serve as a bearing substrate in the display module 100 for supporting other functional structures in the display module 100 to ensure structural stability of the display module 100. The buffer layer 23 may be conductive foam, such as copper foil foam or aluminum foil foam. The buffer layer 23 may act as a shield to prevent electromagnetic interference generated by the circuit board 90 on the binding portion 13 of the flexible display panel 10. At the same time, the buffer layer 23 can act as a buffer to alleviate external impact on the flexible display panel 10 during the manufacturing or use of the flexible display panel 10 and to protect the display panel. In addition, since the buffer layer 23 has a foam structure and has a good heat dissipation effect, the buffer layer 23 can also play a role in heat dissipation, so that the heat generated in use of the flexible display panel 10 may be quickly and effectively discharged through the buffer layer 23, thereby avoiding overheating inside the flexible display panel 10 and affecting the display effect and service life of the display module 100. It should be noted that in order to improve the stability of the connection, the first colloid 30 may be simultaneously connected to the first back plate 21, the second back plate 22, and the buffer layer 23.

Alternatively, the first colloid 30 includes a first state in which the first colloid 30 has flowability and a second state in which the first colloid 30 has stability. The first colloid 30 is a thermosetting adhesive. The first state is a state of the thermosetting adhesive when it is not heated, and the second state is a state of the thermosetting adhesive after heating.

Figure 2:
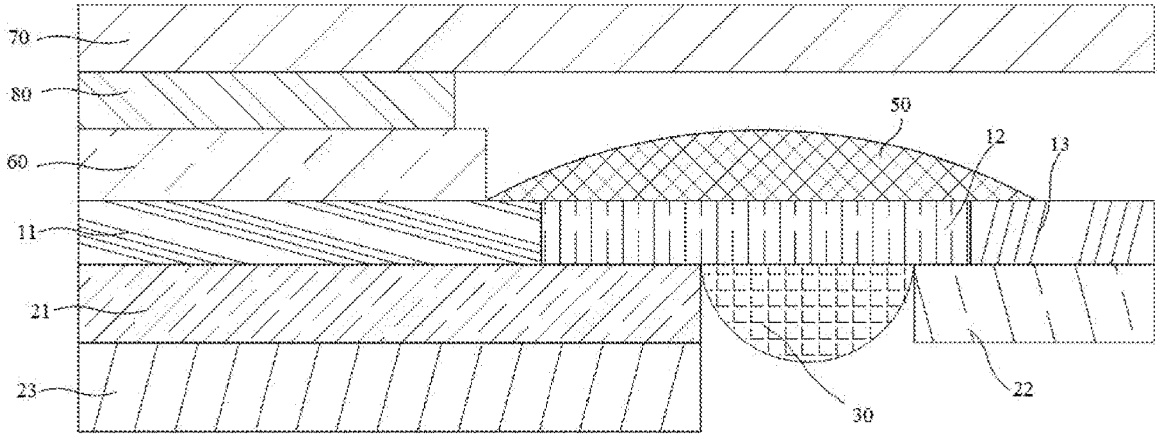
FIG. 2 is a schematic structural diagram of a display module before bending according to the first embodiment of the present disclosure.
Figure 3:
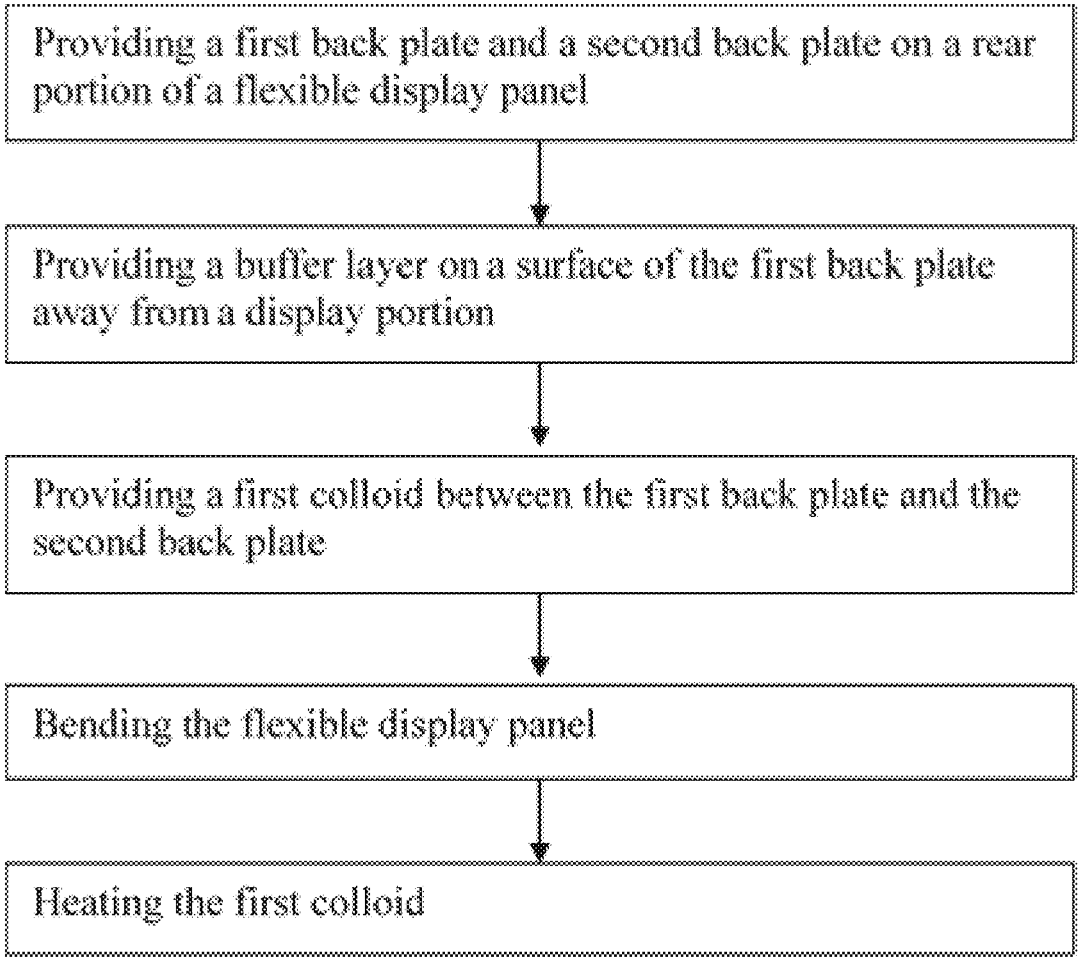
FIG. 3 is a schematic diagram of a process of manufacturing the display module according to the first embodiment of the present disclosure.

Referring to FIGS. 2 and 3, the process of manufacturing the display module 100 is described below.

The first back plate 21 and the second back plate 22 are provided on the rear portion of the flexible display panel 10.

The buffer layer 23 is provided on the surface of the first back plate 21 away from the display portion 11.

The first colloid 30 is provided between the first back plate 21 and the second back plate 22.

The flexible display panel 10 is bent.

The first colloid 30 is heated.

Here, before the flexible display panel 10 is bent, the first back plate 21 is provided corresponding to the display portion 11, and the second back plate 22 is provided corresponding to the binding portion 13, that is, the first back plate 21 and the second back plate 22 are provided at intervals. Then, the buffer layer 23 is adhered to the surface of the first back plate 21 away from the display portion 11. Then, a first colloid 30 may be provided at intervals between the first back plate 21 and the second back plate 22. In this case, the first colloid 30 is in the first state, so that the first colloid 30 flows and is connected to the first back plate 21, the second back plate 22, and the bending portion 12. Then, the flexible display panel 10 is bent to form the bending space AA, and since the first colloid 30 is flowable in the first state, the first colloid 30 is easy to deform to adapt to the bending space AA at different bending radius sizes. Finally, the first colloid 30 is heated and cured, so that the first colloid 30 is converted to the second state so as to be stable, and the first colloid 30 may provide good supporting force to ensure strength requirements of the bending portion 12. It should be noted that the curing temperature is between 40° C. and 80° C. to avoid scalding on the flexible display panel 10.

Alternatively, the viscosity of the first colloid 30 in the first state is W, 20,000 Cp≤W≤60,000 Cp. The viscosity of the first colloid 30 may be 20,000 Cp, 30,000 Cp, 40,000 Cp, 50,000 Cp, or the like, so that in this viscosity range, not only can the flowability of the first colloid 30 in the first state be ensured, but also the first colloid 30 is not easy to cause damage due to diffusion and overflow to other parts during the applying process, thereby increasing the service life of the display module 100.

Alternatively, the display module 100 further includes a protective adhesive layer 50 provided on a surface of the bending portion 12 away from the bending space AA and extending to connect the display portion 11 and the binding portion 13. The protective adhesive layer 50 may be formed of a photocurable adhesive layer having excellent bending properties. The protective adhesive layer 50 may not only protect the bending portion 12 of the flexible display panel 10, but also extend to connect to the display portion 11 and the binding portion 13 to provide a supporting effect on the bending stability of the bending portion 12 and further improve the structural stability of the display module 100.

Figure 4:
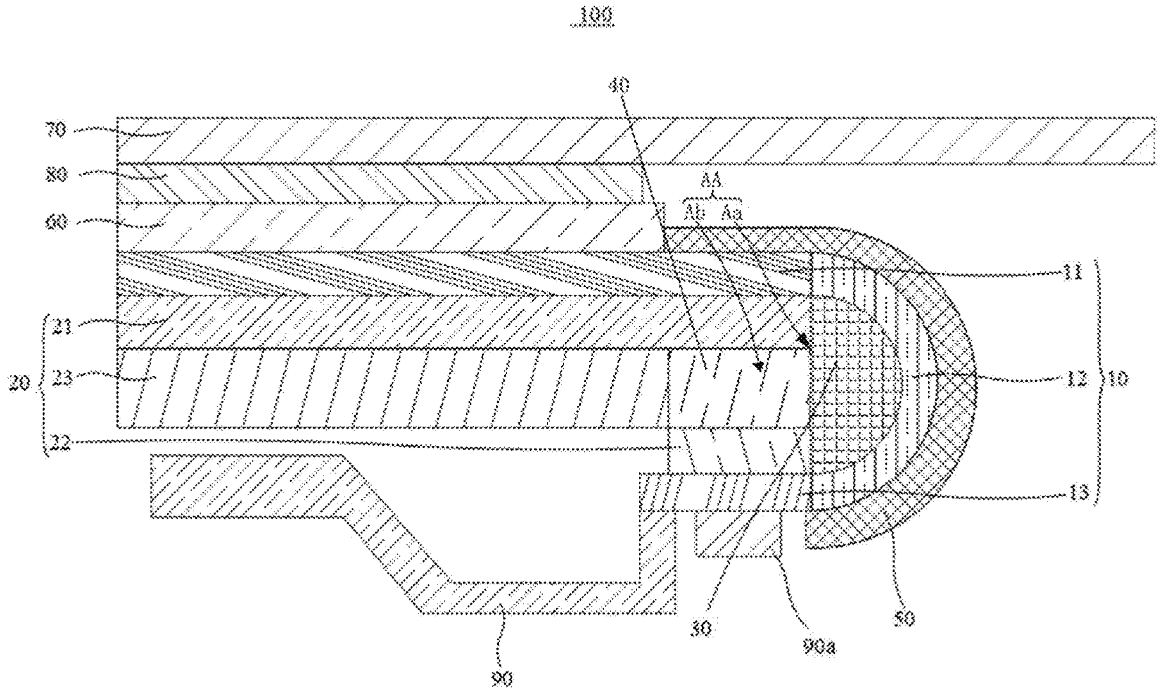
FIG. 4 is a schematic structural diagram of a display module according to a second embodiment of the present disclosure.
Figure 5:
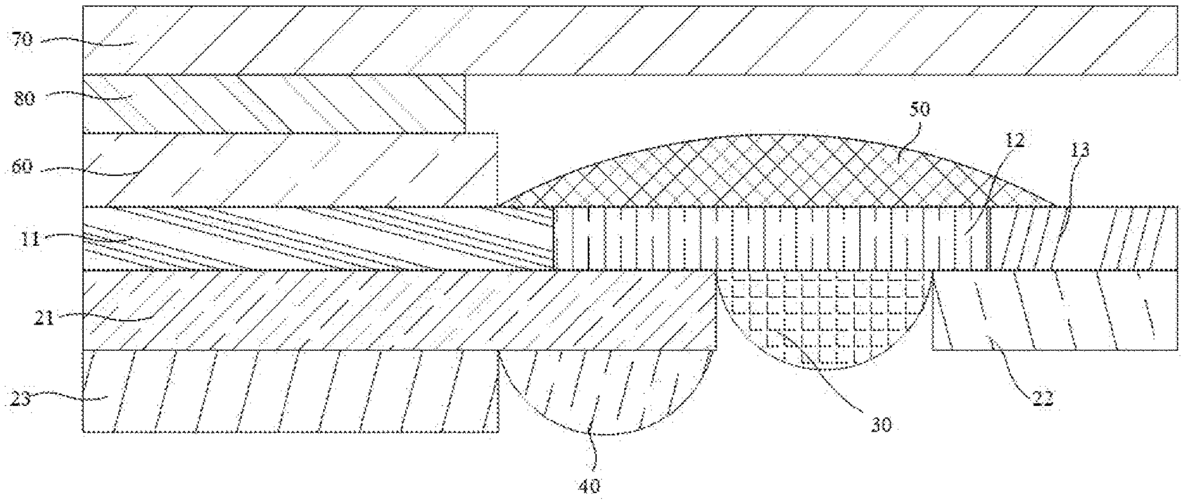
FIG. 5 is a schematic structural diagram of a display module before bending according to the second embodiment of the present disclosure.

Referring to FIGS. 4 and 5, in a second embodiment of the present disclosure, it differs from the first embodiment in that the display module 100 further includes a second colloid 40 connected to the surface of the second back plate 22 facing the first back plate 21, and the second colloid 40 is connected to the first colloid 30. Here, by providing the second colloid 40 to be connected to the second back plate 22 and the first colloid 30 to increase the connection area, the stability of the connection between the second back plate 22 and the first colloid 30 can be further improved, and the stability of the support of the first colloid 30 can be further improved, while the second colloid 40 can also act as a buffer for the second back plate 22.

Further, the bending space AA includes a second subspace Ab communicating with the first subspace Aa. The second subspace Ab is formed between the surface of the first back plate 21 facing the second back plate 22, the surface of the buffer layer 23 facing the bending portion 12 and the surface of the second back plate 22 facing the first back plate 21. The second colloid 40 is provided in the second subspace Ab, and is connected to the surface of the first back plate 21 facing the second back plate 22 and the surface of the buffer layer 23 facing the bending portion 12.

It will be appreciated that by forming the second subspace Ab in communication with the first subspace Aa and filling the second subspace Ab with the second colloid 40, the connection area of the second colloid 40 is increased to improve the stability of the second colloid 40 after connection. The buffer layer 23 is positioned between the first back plate 21 and the second back plate 22, that is, the distance between the first back plate 21 and the second back plate 22 is equal to the thickness of the second colloid 40, so that the distance between the first back plate 21 and the second back plate 22 can be controlled by adjusting the thickness of the second colloid 40, thereby controlling the bending radius of the bending portion 12. In this way, the bending radius R of the bending portion 12 may reach R≤0.2 mm, so that the narrow bezel of the display module 100 can be provided.

Alternatively, the second colloid 40 is of the same material as the first colloid 30. The second colloid 40 and the first colloid 30 may each be made of a thermosetting material. That is, the second colloid 40 also has flowability in the first state and stability in the second state. In this way, the second colloid 40 can be dispensed on the first back plate 21 when the first colloid 30 is dispensed. As shown in FIG. 5, not only is the preparation efficiency of the display module 100 improved, but also the second colloid 40 can be connected to the first colloid 30 and the second back plate 22 when the bending portion 12 is bent after the second colloid 40 flows. The first colloid 30 and the second colloid 40 can be heated and cured at the same time after bending, so that the first colloid 30 and the second colloid 40 are converted into the second state, thereby being stable and providing good supporting force.

Alternatively, an orthographic projection of the second colloid 40 on the buffer layer 23 covers an orthographic projection of the second back plate 22 on the buffer layer 23. This ensures that the second colloid 40 completely covers the surface of the second back plate 22 facing the buffer layer 23, thereby increasing the contact area between the second colloid 40 and the second back plate 22, and further improving the stability of the connection between the second colloid 40 and the second back plate 22.

Figure 6:
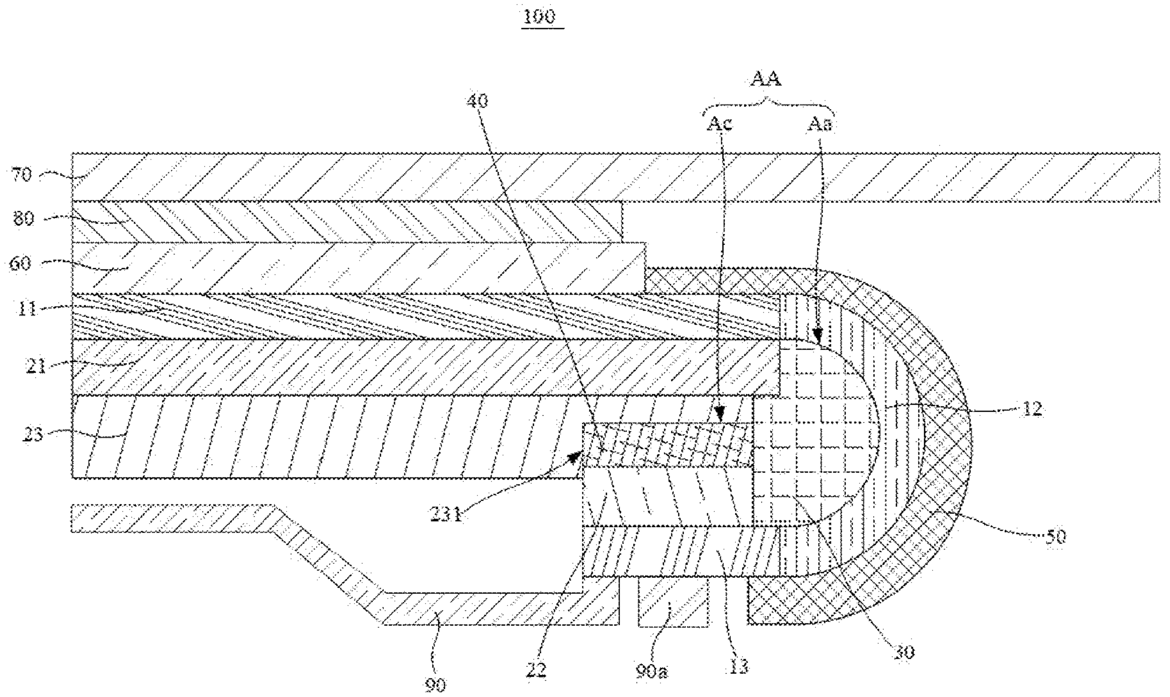
FIG. 6 is a schematic structural diagram of a display module according to a third embodiment of the present disclosure.
Figure 7:
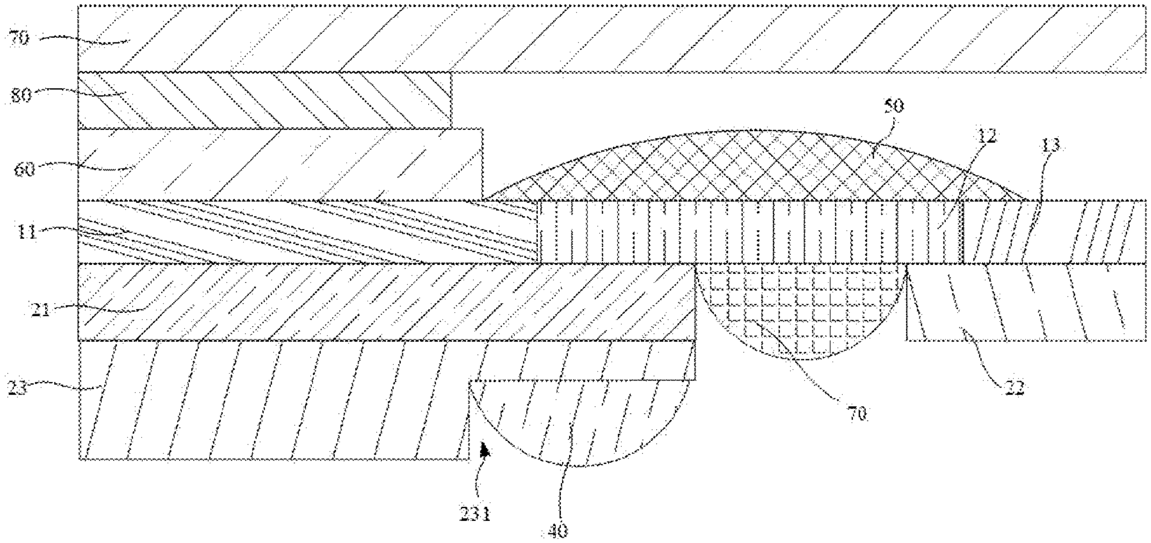
FIG. 7 is a schematic structural diagram of a display module before bending according to the third embodiment of the present disclosure.

Referring to FIGS. 6 and 7, in a third embodiment of the present disclosure, it differs from the second embodiment in that the bending space AA includes a third subspace Ac communicating with the first subspace Aa. An edge of the surface of the buffer layer 23 away from the first back plate 21 is provided with a groove 231 to form the third subspace Ac, and the second colloid 40 is provided in the groove 231 and is connected to the groove wall of the groove 231. Here, the second colloid 40 may be disposed between the buffer layer 23 and the second back plate 22, so that the buffer layer 23 and the second colloid 40 may simultaneously buffer the first back plate 21 and the second back plate 22, and the supporting function between the first back plate 21 and the second back plate 22 may be improved. The groove 231 is provided to facilitate the accurate glue dispensing of the second colloid 40, and the second colloid 40 is provided in the groove 231 to be connected to the groove wall and the groove bottom, so that the bonding area between the second colloid 40 and the buffer layer 23 is increased, thereby improving the bonding strength of the second colloid 40. Further, the groove wall of the groove 231 is provided obliquely in a direction away from the bending space AA so that the groove wall of the groove 231 is provided in an inclined plane, thereby further increasing the bonding area between the second colloid 40 and the buffer layer 23.

Further, the second back plate 22 is at least partially received in the groove 231. In this way, on the basis of ensuring the support stability between the first back plate 21 and the second back plate 22, the distance between the first back plate 21 and the second back plate 22 can be reduced, and the bending radius of the bending portion 12 can be reduced, so that the narrow bezel of the display module 100 can be further provided. Alternatively, the surface of the buffer layer 23 facing the first subspace Aa is located innerly relative to the surface of the first back plate 21 facing the first subspace Aa. In this way, the space of the first subspace Aa is further increased, and the volume of the first colloid 30 is further increased, so that not only is the bonding area with the first back plate 21 improved, but also the bonding strength is improved, and the support stability of the first colloid 30 can be further improved.

A display module provided by the embodiment of the present disclosure are described in detail above. The principles and implementations of the present disclosure have been described with reference to specific embodiments, and the description of the above embodiments is merely intended to aid in the understanding the method of the present disclosure and its core idea. At the same time, changes may be made by those skilled in the art to both the specific implementations and the scope of application in accordance with the teachings of the present disclosure. In view of the foregoing, the content of the present specification should not be construed as limiting the disclosure.

What is claimed is:

1. A display module, comprising:

a flexible display panel comprising a display portion, a bending portion, and a binding portion, wherein the display portion and the binding portion are connected to each other by the bending portion, and the binding portion is disposed at a rear portion of the display portion; a bearing assembly disposed between the display portion and the binding portion, wherein there is a bending space between the bearing assembly and the bending portion; and a first colloid disposed in the bending space and connected to the bearing assembly and the bending portion; wherein the bending space comprises a first subspace, and the bearing assembly comprises: a first back plate provided at a side of the display portion facing the binding portion; a second back plate provided at a side of the binding portion facing the display portion; a buffer layer provided at a surface of the first back plate away from the display portion; and wherein the first subspace is between a surface of the first back plate facing the bending portion, a surface of the second back plate facing the bending portion, the first colloid is disposed in the first subspace, and the first colloid is connected to at least one of the first back plate, the second back plate, or the buffer layer; and a second colloid, wherein the second colloid is connected to a surface of the second back plate facing the first back plate, and the second colloid is connected to the first colloid, wherein the first colloid and the second colloid each comprise a thermosetting adhesive material.

2. The display module according to claim 1, wherein the bending space further comprises a second subspace communicating with the first subspace;

the second subspace is between a surface of the first back plate facing the second back plate, a surface of the buffer layer facing the bending portion, and the surface of the second back plate facing the first back plate, the second colloid is provided in the second subspace, and the second colloid is connected to the surface of the first back plate facing the second back plate and the surface of the buffer layer facing the bending portion.

3. The display module according to claim 2, wherein the second colloid is disposed between the first back plate and the second back plate, and a distance between the first back plate and the second back plate is equal to a thickness of the second colloid.

4. The display module according to claim 1, wherein the bending space further comprises a third subspace communicating with the first subspace; and an edge of a surface of the buffer layer away from the first back plate is provided with a groove as the third subspace, and the second colloid is provided in the groove and connected to a groove wall of the groove.

5. The display module according to claim 4, wherein the second back plate is at least partially received in the groove.

6. The display module according to claim 5, wherein a distance between the first back plate and the second back plate is less than a thickness of the buffer layer.

7. The display module according to claim 4, wherein a sidewall of the groove is provided obliquely in a direction away from the bending space.

8. The display module according to claim 4, wherein the buffer layer exposes at least a portion of the surface of the first back plate away from the display portion and close to the first subspace.

9. The display module according to claim 1, wherein an orthographic projection of the second colloid on the first back plate covers an orthographic projection of the second back plate on the buffer layer.

10. The display module according to claim 1, wherein the second colloid and the first colloid are of a same material.

11. The display module according to claim 1, wherein a material of the first colloid has a viscosity of W before being heated and cured, and 20,000 Cp≤W≤60,000 Cp.

12. The display module according to claim 1, further comprising a protective adhesive layer provided on a surface of the bending portion away from the bending space and extending to cover the display portion and the binding portion.

13. The display module according to claim 1, further comprising a circuit board and a chip, the circuit board and the chip are disposed at and connected to a side of the binding portion away from the display portion, and the bending portion is configured to electrically connect a switching control layer in the display portion to the circuit board and the chip.

14. The display module according to claim 1, further comprising:

a polarizing plate provided at a side of the display portion away from the first back plate;

a cover plate provided at a side of the polarizing plate away from the display portion; and an optical adhesive layer provided between the polarizing plate and the cover plate.

* * * * *